(12) United States Patent
Ren et al.

(10) Patent No.: US 11,945,015 B1
(45) Date of Patent: Apr. 2, 2024

(54) SEMI-AUTOMATIC ADJUSTMENT DEVICE FOR SUPPRESSING TENSION FLUCTUATIONS DURING ROLLING PROCESS OF ULTRA-THIN STRIP

(71) Applicant: Taiyuan University of Technology, Taiyuan (CN)

(72) Inventors: Zhongkai Ren, Taiyuan (CN); Tao Wang, Taiyuan (CN); Xiao Liu, Taiyuan (CN); Peng Chen, Taiyuan (CN); Xiaobao Ma, Taiyuan (CN); Yaxing Liu, Taiyuan (CN); Qi Zhang, Taiyuan (CN)

(73) Assignee: TAIYUAN UNIVERSITY OF TECHNOLOGY, Taiyuan (CN)

( * ) Notice: Subject to any disclaimer, the term of this patent is extended or adjusted under 35 U.S.C. 154(b) by 0 days.

(21) Appl. No.: 18/479,072

(22) Filed: Oct. 1, 2023

(30) Foreign Application Priority Data

Jul. 10, 2023 (CN) .......................... 202310838117.6

(51) Int. Cl.
*B21B 1/40* (2006.01)
*B21B 13/02* (2006.01)

(52) U.S. Cl.
CPC ................ *B21B 1/40* (2013.01); *B21B 13/02* (2013.01); *B21B 2265/02* (2013.01)

(58) Field of Classification Search
CPC ........ B21B 1/40; B21B 13/02; B21B 2265/02
See application file for complete search history.

(56) References Cited

U.S. PATENT DOCUMENTS

| 3,875,775 A * | 4/1975 | Daniljuk ................. B21B 37/64 72/8.8 |
| 2011/0120202 A1* | 5/2011 | Hohenbichler ....... B21B 37/007 72/7.1 |

FOREIGN PATENT DOCUMENTS

| CN | 104275349 A | 1/2015 |
| CN | 110259241 A | 9/2019 |

(Continued)

OTHER PUBLICATIONS

CNIPA, Notification of a First Office Action for CN202310838117.6, dated Aug. 9, 2023.

(Continued)

*Primary Examiner* — Teresa M Ekiert
(74) *Attorney, Agent, or Firm* — Zhigang Ma (57) ABSTRACT

A semi-automatic adjustment device for suppressing tension fluctuations during a rolling process of an ultra-thin strip includes a semi-automatic tension regulator, a semi-automatic tuned mass damper of variable stiffness and damping, a coiler, a tension roller and a twenty-high roller system. The semi-automatic tension regulator is disposed between the coiler and the tension roller, the semi-automatic tuned mass damper of variable stiffness and damping is disposed between the tension roller and the twenty-high roller system. The semi-automatic adjustment device can be used to reduce a short-time fluctuation impact of tension during startup and shutdown of a twenty-high roll mill when the twenty-high rolling mill rolls an ultra-thin strip, improve system stability, absorb the continuous micro disturbances generated during the rolling process of the twenty-high roll mill, and achieve flexible and stable adjustment of tension during the rolling process.

3 Claims, 5 Drawing Sheets

(56) References Cited

FOREIGN PATENT DOCUMENTS

| | | |
|---|---|---|
| CN | 114873460 A | 8/2022 |
| CN | 218201254 U | 1/2023 |

OTHER PUBLICATIONS

Taiyuan University of Technology (Applicant), Reply to Notification of a First Office Action for CN202310838117.6, w/(allowed) replacement claims, dated Aug. 22, 2023.

CNIPA, Notification to grant patent right for invention in CN202310838117.6, dated Aug. 25, 2023.

\* cited by examiner

SEMI-AUTOMATIC ADJUSTMENT DEVICE FOR SUPPRESSING TENSION FLUCTUATIONS DURING ROLLING PROCESS OF ULTRA-THIN STRIP

TECHNICAL FIELD

The disclosure relates to the technical field of ultra-thin strip rolling (i.e., foil rolling), and particularly to a semi-automatic adjustment device for suppressing tension fluctuations during a rolling process of an ultra-thin strip.

BACKGROUND

Fluctuations generated during a rolling process of an ultra-thin strip (i.e., ultra-thin strip rolling or foil rolling) can cause unstable tension adjustment of a tension roller, leading to unstable rolling performance and even the occurrence of strip breakage, resulting in shutdown faults. There are three main types of fluctuations: significant fluctuations and impacts during start and stop of a rolling mill, fluctuations caused by an uneven strip thickness during the rolling process, and fluctuations caused by an unstable control system.

Therefore, it is considered to design a tension adjustment device to suppress the significant fluctuations and impacts during the startup and shutdown of the rolling mill, and to apply a tuned mass damper to the rolling process of the ultra-thin strip to suppress the tension fluctuations caused by the uneven strip thickness and the unstable control system during the rolling process.

The tuned mass damper is composed of a mass block, a damper, and springs. When a vibration of a structure that needs to be suppressed causes a vibration of the tuned mass damper, the mass block of the tuned mass damper can give a reverse inertia force to the structure. When a frequency of the tuned mass damper is consistent with a vibration frequency generated by the structure, a good vibration reduction effect is produced. However, due to functional changes of the structure, a natural frequency of the structure changes during the rolling process, resulting in a poor vibration reduction effect of the tuned mass damper. Eddy current dampers have been widely used compared to silicone oil dampers due to their advantages of easy maintenance and good durability. A principle of the eddy current dampers is that when a magnetic mass block generates a vibration, a relative motion between the magnet mass block and a conductor plate occurs to cut magnetic induction lines and then generate an electromotive force in the conductor plate, thus an eddy current is formed, a vibration energy is dissipated through the heat dissipation of the conductor plate, so as to achieve vibration control.

The traditional eddy current tuned mass damper cannot adjust its own frequency and damping, and inappropriate restoring force can reduce the control effect and even have the negative effect. Therefore, it is of practical significance to consider how to adjust the damping and frequency of the damper in real time.

SUMMARY

An objective of the disclosure is to provide a semi-automatic adjustment device for suppressing tension fluctuations during a rolling process of an ultra-thin strip, the semi-automatic adjustment device is used to reduce a short-term fluctuation impact of tension during startup and shutdown of a twenty-high rolling mill when the twenty-high rolling mill rolls an ultra-thin strip and to improve system stability, to absorb continuous micro disturbances generated when the twenty-high rolling mill rolls the ultra-thin strip (such as fluctuations caused by an uneven thickness of the ultra-thin strip during the rolling process, fluctuations caused by an unstable control system) to achieve flexible and stable adjustment of tension during the rolling process.

In order to achieve the above objective, the semi-automatic adjustment device for suppressing tension fluctuations during the rolling process of the ultra-thin strip is provided, which adopts the following technical scheme.

The semi-automatic adjustment device for suppressing tension fluctuations during the rolling process of the ultra-thin strip includes a semi-automatic tension regulator, a semi-automatic tuned mass damper of variable stiffness and damping, a coiler, a tension roller and a twenty-high roller system. The semi-automatic tension regulator is disposed between the coiler and the tension roller, and the semi-automatic tuned mass damper of variable stiffness and damping is disposed between the tension roller and the twenty-high roller system.

In an embodiment, the semi-automatic tension regulator includes a tension regulator and a servo control unit. The tension regulator includes an electric push rod, a baffle, dampers, first springs, first slots, first bearing seats and a first pressure roller, and the servo control unit includes a pressure sensor and a first controller.

In an embodiment, the electric push rod is fixedly connected to the baffle, and the electric push rod is connected to the first controller through conducting wires. An end of one of the first springs is connected to the pressure sensor, and another end of the one of the first springs is fixedly connected to the baffle. The dampers are embedded in the first springs, respectively. Two ends of the first pressure roller are disposed with the first bearing seats, and the first bearing seats are disposed in the first slots, respectively. And the pressure sensor is disposed on an end of one of the first bearing seats, and configured to detect a pressure exerted on the first pressure roller. And the pressure sensor is connected to the first controller through conducting wires.

In an embodiment, the semi-automatic tuned mass damper of variable stiffness and damping includes a damping assembly, a semi-automatic variable stiffness assembly, a semi-automatic variable damping assembly and a servo control assembly.

In an embodiment, the damping assembly includes a fixing shell, second springs, telescopic rods, second bearing seats, second slots, a mass block and a second pressure roller. The semi-automatic variable stiffness assembly includes an electromotor, a bell-shaped cover, a hydraulic pump, hoses, and an oil fluid. The semi-automatic variable damping assembly includes an electrical machine, racks, gears, conductor-concentrating flux plates and permanent magnets. And the servo control assembly includes a first acceleration sensor, a second acceleration sensor and a second controller.

In an embodiment, the fixing shell is fixedly connected to the second slots. The telescopic rods are respectively embedded in the second springs, and an end of one of the second springs is connected to the second acceleration sensor, another end of the one of the second springs is fixedly connected to the mass block. Two ends of the second pressure roller are respectively provided with the second bearing seats, and the second bearing seats are respectively disposed at the second slots. The permanent magnets arranged in two rows are symmetrically disposed on two sides of the mass block. The conductor-concentrating flux plates are symmetrically disposed on the two sides of the mass block. A side of each conductor-concentrating flux plate is a concentrating flux plate, and another side of each conductor-concentrating flux plate is a conductor baseplate; the conductor baseplates of the conductor-concentrating flux plates are disposed facing towards the permanent magnets and fixedly connected to the racks, and the racks are engaged with the gears, and the gears are connected to the electrical machine. An interior of the mass block is a hollow structure with the oil fluid, and the interior of the mass block is connected to the hydraulic pump through the hoses, the hydraulic pump is connected to the electromotor through the bell-shaped cover. The first acceleration sensor is disposed at a center position on an upper side of the mass block and configured to detect a vertical acceleration of the mass block, and the second acceleration sensor is disposed on one of the second bearing seats and configured to detect a vertical acceleration of the second pressure roller. The first acceleration sensor and the second acceleration sensor are connected to the controller through the wires.

The beneficial effects of the disclosure are as follows.

1. The disclosure realizes semi-automatic variable stiffness of an eddy current tuned mass damper and real time adjustment of a vertical frequency of the damper.

2. The disclosure realizes semi-automatic variable damping of the eddy current tuned mass damper, which ensures a good vibration reduction effect.

3. The disclosure eliminates the stress of the ultra-thin strip of the rolling process to a certain extent, and obtains the appropriate tension of the ultra-thin strip.

4. The semi-automatic tension regulator of the disclosure reduces a short-term fluctuation impact of tension during startup and shutdown of the twenty-high rolling mill when rolling the ultra-thin strip, and improves system stability.

5. The semi-automatic tuned mass damper of variable stiffness and damping in the disclosure can absorb the continuous micro disturbances generated during the rolling process of ultra-thin strips by the twenty-high roll mill, achieving flexible and stable adjustment of tension during the rolling process.

BRIEF DESCRIPTION OF DRAWINGS

In order to provide a clearer explanation of the specific embodiments of the disclosure or the technical solutions in the prior art, the following will briefly introduce the accompanying drawings required in the description of the specific embodiments or prior art. In all drawings, similar components or parts are generally identified by similar drawing markings. In the attached drawings, each component or part may not necessarily be drawn to the actual scale.

Description of reference numerals: 1. ultra-thin strip; 2. semi-automatic tension regulator; 201. electric push rod; 202. baffle; 203. damper; 204. first spring; 205. first slot; 206. first bearing seat; 207. first pressure roller; 208. pressure sensor; 3. semi-automatic tuned mass damper of variable stiffness and damping; 301. electrical machine; 302. rack; 303. gear; 304. fixing shell; 305. second spring; 306. telescopic rod; 307. second bearing seat; 308. second slot; 309. conductor-concentrating flux plate; 310. mass block; 311. permanent magnet; 312. second pressure roller; 313. electromotor; 314. bell-shaped cover; 315. hydraulic pump; 316. first acceleration sensor; 317. second acceleration sensor; 318. hose; 4. twenty-high roller system; 5. tension roller; 6. coiler.

DETAILED DESCRIPTION OF EMBODIMENTS

The followings are specific embodiments to illustrate the embodiments of the disclosure, and those skilled in the art can easily understand the other advantages and effects of the disclosure from the content disclosed in the specification. The disclosure can also be implemented or applied through different specific embodiments, and the details in the specification can also be amended or modified based on different perspectives and applications without departing from the spirit of the disclosure. It should be noted that, without conflict, the following embodiments and the features in the embodiments can be combined with each other.

In the description of the disclosure, unless otherwise stated, "multiple" means two or more; The terms "up", "down", "left", "right", "inside", "outside", "front end", "back end", "head", "tail", etc. indicate the orientation or position relationship based on the orientation or position relationship shown in the attached drawings, only for the convenience of describing the disclosure and simplifying the description, and not to indicate or imply that the device or element referred to must have a specific orientation, be constructed and operated in a specific orientation, therefore, it cannot be understood as a limitation of the disclosure. In addition, the terms "first", "second", "third", etc. are only used to describe the purpose and cannot be understood as indicating or implying relative importance.

In the description of the disclosure, it should be noted that unless otherwise specified and limited, the term "connected" should be understood broadly, for example, it can be fixed connection, detachable connection, or integral connection. And it can be a mechanical connection or an electrical connection. It can be directly connected or indirectly connected through an intermediate media. For those skilled in the art, the specific meaning of the above term in the disclosure can be understood in specific circumstances.

The following provides a further detailed description of the specific embodiments of the disclosure in conjunction with the accompanying drawings and embodiments.

Referring to FIGS. 1-9, an embodiment of the disclosure provides a semi-automatic adjustment device for suppressing tension fluctuations during a rolling process of an ultra-thin strip.

Figure 1:
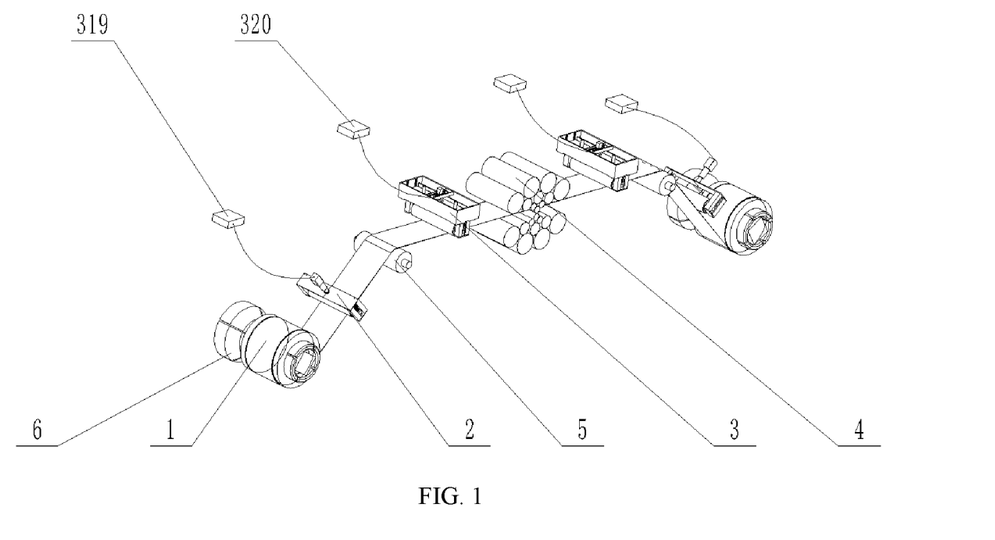
FIG. 1 illustrates a schematic diagram of a semi-automatic adjustment device for suppressing tension fluctuations during a rolling process of an ultra-thin strip according to an embodiment of the disclosure.
Figure 2:
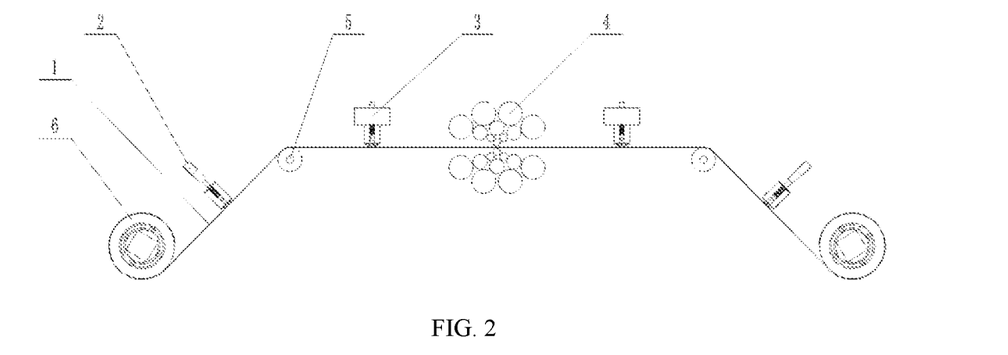
FIG. 2 illustrates a front view of the semi-automatic adjustment device for suppressing tension fluctuations during the rolling process of the ultra-thin strip according to the embodiment of the disclosure.

The semi-automatic adjustment device for suppressing tension fluctuations during the rolling process of the ultra-thin strip includes a semi-automatic tension regulator 2, a semi-automatic tuned mass damper of variable stiffness and damping 3, a twenty-high roller system 4, a tension roller 5 and a coiler 6. The semi-automatic tension regulator 2 is disposed between the coiler 6 and the tension roller 5, and the semi-automatic tuned mass damper of variable stiffness and damping 3 is disposed between the tension roller 5 and the twenty-high roller system 4.

Figure 3:
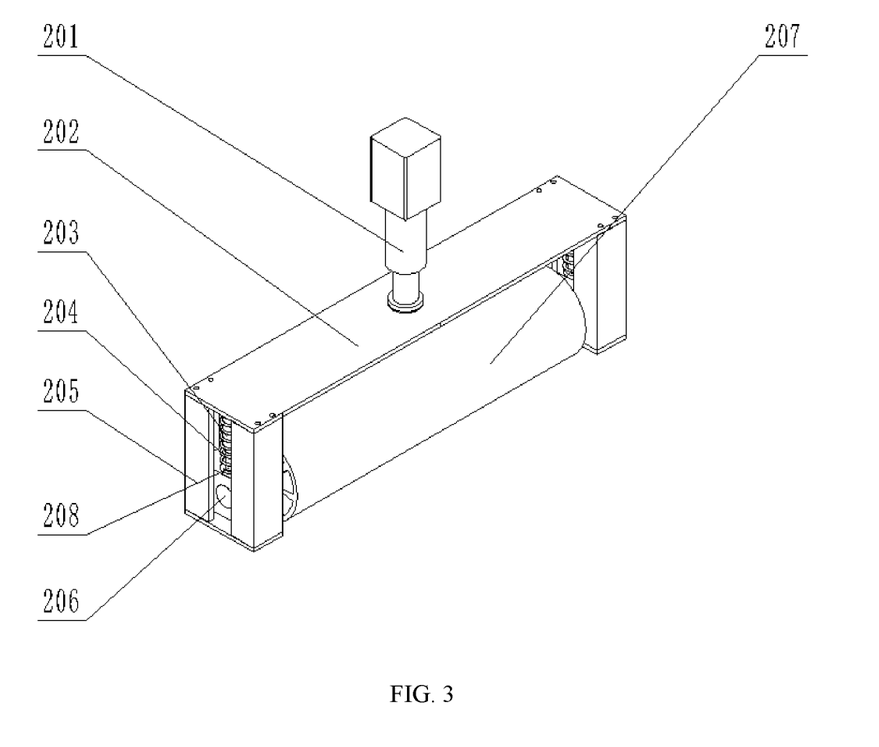
FIG. 3 illustrates a schematic diagram of a semi-automatic tension regulator of the semi-automatic adjustment device according to the embodiment of the disclosure.
Figure 4:
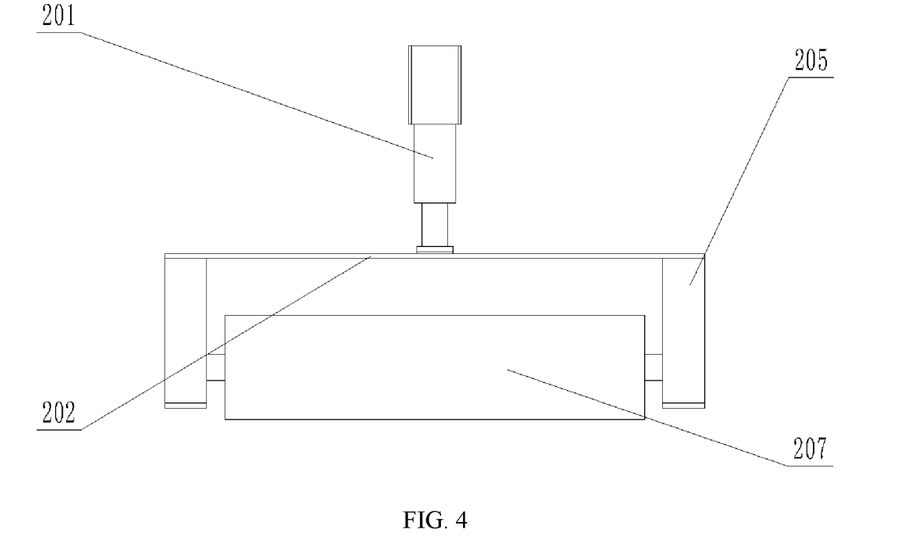
FIG. 4 illustrates a front view schematic diagram of the semi-automatic tension regulator of the semi-automatic adjustment device according to the embodiment of the disclosure.
Figure 5:
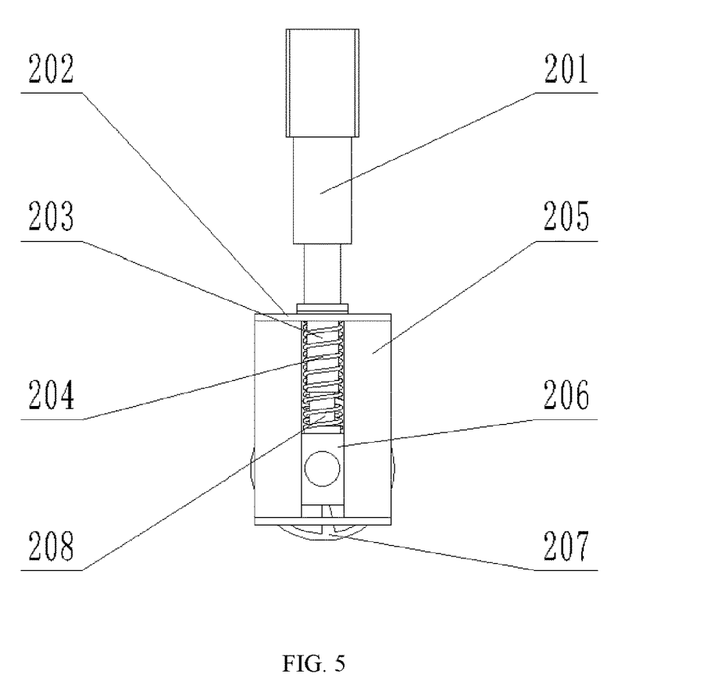
FIG. 5 illustrates a side view schematic diagram of the semi-automatic tension regulator of the semi-automatic adjustment device according to the embodiment of the disclosure.
Figure 6:
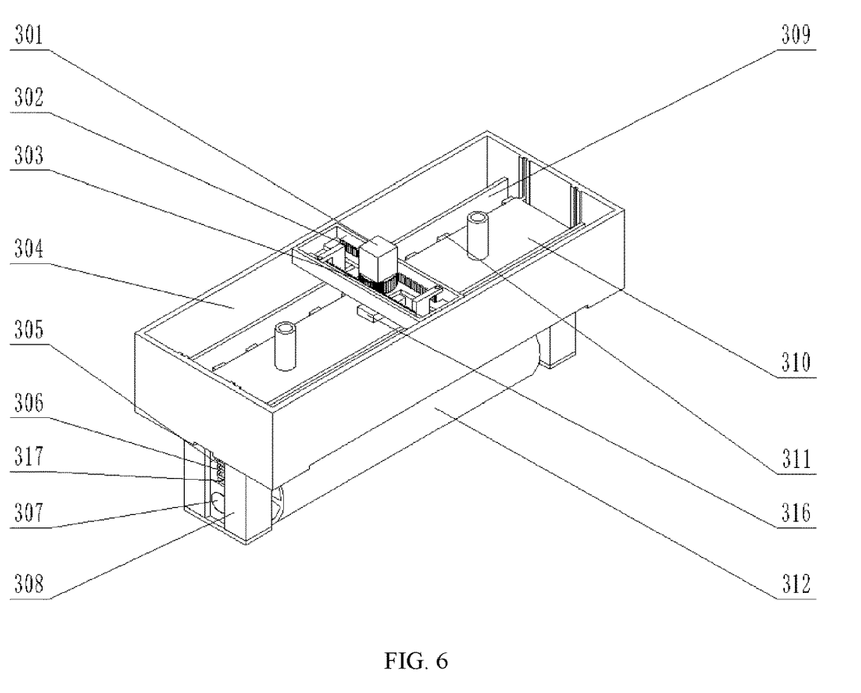
FIG. 6 illustrates a schematic diagram of a semi-automatic tuned mass damper of variable stiffness and damping of the semi-automatic adjustment device according to the embodiment of the disclosure.
Figure 7:
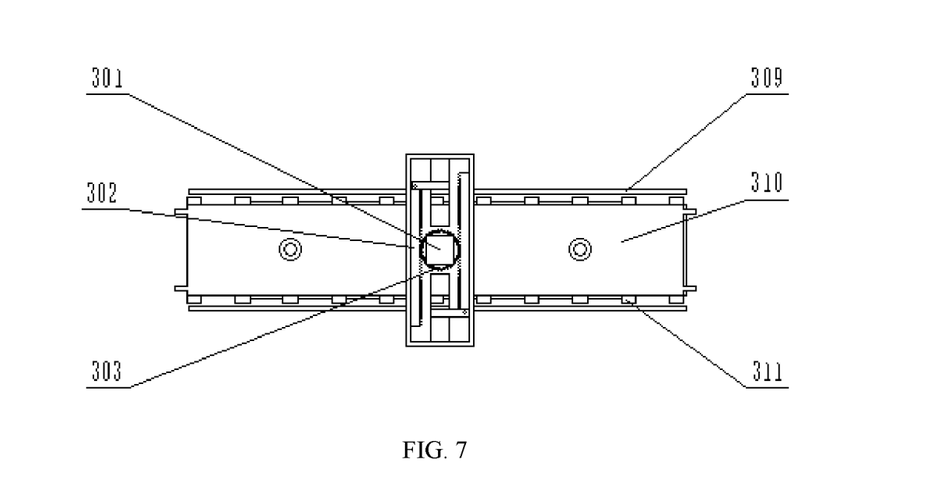
FIG. 7 illustrates a schematic diagram from top to bottom of a semi-automatic variable damping assembly of the semi-automatic adjustment device according to the embodiment of the disclosure.
Figure 8:
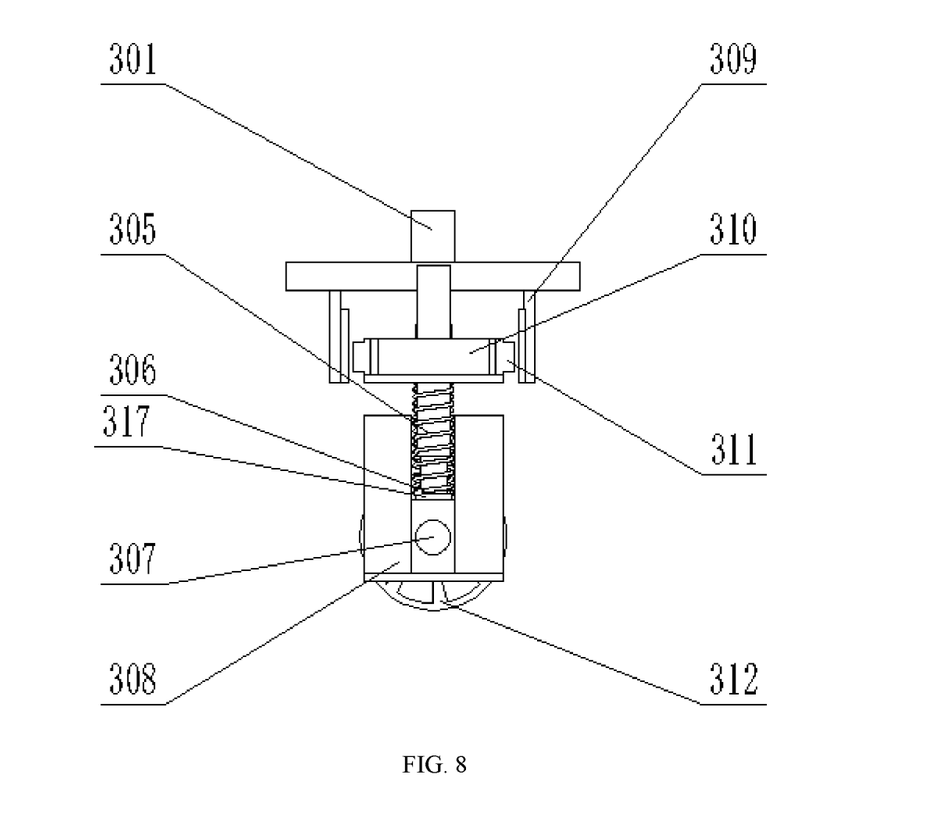
FIG. 8 illustrates a front view schematic diagram of the semi-automatic variable damping assembly of the semi-automatic adjustment device according to the embodiment of the disclosure.
Figure 9:
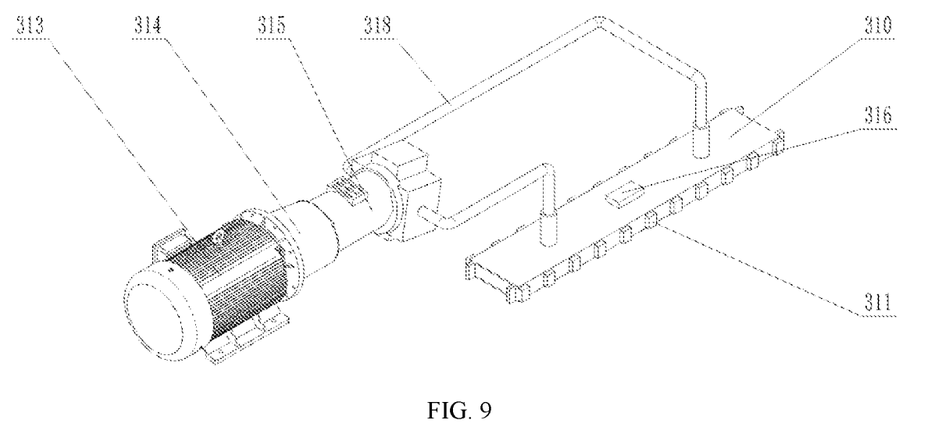
FIG. 9 illustrates a schematic diagram of a semi-automatic variable stiffness assembly of the semi-automatic adjustment device according to the embodiment of the disclosure.

The semi-automatic tension regulator 2 includes a tension regulator and a servo control unit. The tension regulator includes an electric push rod 201, a baffle 202, two damper 203, two first springs 204, first slots 205, first bearing seats 206 and a first pressure roller 207, and the servo control unit includes a pressure sensor 208 and a first controller.

The electric push rod 201 is fixedly connected to the baffle 202, and the electric push rod 201 is connected to the first controller through conducting wires. An end of one of the two first springs 204 is connected to the pressure sensor 208, and another end of the one of the two first springs 204 is fixedly connected to the baffle 202, the dampers 203 are embedded in the two first springs 204, respectively. Two ends of the first pressure roller 207 are respectively disposed with the first bearing seats 206, and the first bearing seats 206 are respectively disposed in the first slots 205. The pressure sensor 208 is disposed on an end of one of the first bearing seats 206, and configured to detect a pressure exerted on the first pressure roller 207. The pressure sensor 208 is connected to the first controller through conducting wires.

During a specific process, the electric push rod 201 pushes the semi-automatic tension regulator 2 to contact the ultra-thin strip 1, the electric push rod 201 applies the initial pressure to the ultra-thin strip 1 through the gravity of the first pressure roller 207, then the first controller adjusts a pushing length of the electric push rod 201 based on the pressure obtained by the pressure sensor 208, thereby obtaining an optimal tension of the ultra-thin strip 1 and eliminating the stress of the ultra-thin strip 1 as much as possible. When the first pressure roller 207 is subjected to the fluctuation impact generated during the startup and shutdown of the twenty-high rolling mill, the dampers 203 and the two first springs 204 can suppress the fluctuation impact as much as possible, thereby making the tension adjustment of the ultra-thin strip 1 softer during the rolling process and making the control system more stable.

The semi-automatic tuned mass damper of variable stiffness and damping 3 includes a damping assembly, a semi-automatic variable stiffness assembly, a semi-automatic variable damping assembly and a servo control assembly. And the damping assembly includes a fixing shell 304, two second springs 305, telescopic rods 306, second bearing seats 307, second slots 308, a mass block 310 and a second pressure roller 312. The semi-automatic variable stiffness assembly includes an electromotor 313, a bell-shaped cover 314, a hydraulic pump 315, hoses 318, and an oil fluid. The semi-automatic variable damping assembly includes an electrical machine 301, two racks 302, gears 303, conductor-concentrating flux plates 309 and permanent magnets 311. The servo control assembly includes a first acceleration sensor 316, a second acceleration sensor 317 and a second controller.

The fixing shell 304 is fixedly connected to the second slots 308. The telescopic rods 306 are respectively embedded in the two second springs 305, and an end of one of the two second springs 305 is connected to the second acceleration sensor 317, another end of the one of the two second springs 305 is fixedly connected to the mass block 310. Two ends of the second pressure roller 312 are respectively provided with the second bearing seats 307, and the second bearing seats 307 are respectively disposed at the second slots 308. The permanent magnets 311 arranged in two rows are symmetrically disposed on two sides of the mass block 310, and the conductor-concentrating flux plates 309 are symmetrically disposed on the two sides of the mass block 310. A side of each conductor-concentrating flux plate 309 is a concentrating flux plate, and another side of the each conductor-concentrating flux plate 309 is a conductor baseplate; the conductor baseplates of the conductor-concentrating flux plates 309 are disposed facing towards the permanent magnets 311 and fixedly connected to the two racks 302, and the two racks 302 are engaged with the gears 303, and the gears 303 are connected to the electrical machine 301. An interior of the mass block 310 is a hollow structure with the oil fluid, and the interior of the mass block 310 is connected to the hydraulic pump 315 through the hoses 318, the hydraulic pump 315 is connected to the electromotor 313 through the bell-shaped cover 314. The first acceleration sensor 316 is disposed at a center position on an upper side of the mass block 310 and configured to detect a vertical acceleration of the mass block 310, and the second acceleration sensor 317 is disposed on the second bearing seats 307 and configured to detect a vertical acceleration of the second pressure roller 312, the first acceleration sensor 316 and the second acceleration sensor 317 are connected to the controller through conducting wires.

During the specific process, when the ultra-thin strip 1 generates fluctuations due to uneven strip thickness or unstable control system during the rolling process, the fluctuations are transmitted to the mass block 310 through the second pressure roller 312 and the two second springs 305, which causes a vertical vibration of the mass block 310, thereby driving the permanent magnets 311 to cut the magnetic induction line with the conductor-concentrating flux plates 309, generating eddy current and dissipating vibration energy through the heat dissipation of the conductor-concentrating flux plates 309, thus achieving suppression of fluctuations. The second controller receives acceleration signals of the first acceleration sensor 316 and the second acceleration sensor 317, and processes the acceleration signals to obtain instantaneous vibration frequencies of the mass block 310 and the ultra-thin strip 1 through Hilbert-Huang transformation algorithm. When it is found that the vibration frequency of the mass block 310 is inconsistent with the vibration frequency of the ultra-thin strip 1, the second controller controls the electrical machine 301 and the electromotor 313 to work individually, and the electrical machine 301 works to drive the gears 303 to rotate, and then drive the two racks 302 to move in the same direction or reverse directions, thereby changing a distance between the conductor-concentrating flux plates 309 and the permanent magnets 311, ultimately changing a magnitude of the eddy current damping and adjusting the magnitude of the eddy current damping in real time to achieve the optimal vibration energy dissipation effect. The electromotor 313 works to drive the hydraulic pump 315 to adjust the amount of the oil fluid in the mass block 310, thereby changing the stiffness of the semi-automatic tuned mass damper of variable stiffness and damping 3 and tuning the frequency of the semi-automatic tuned mass damper of variable stiffness and damping 3 in real time to achieve the optimal vibration control effect.

Finally, the flexible and stable adjustment of tension in the rolling process is realized.

The above embodiment is only used to illustrate the disclosure and not to limit it. Those skilled in the art can also make various changes and variations without departing from the spirit and scope of the disclosure. Therefore, all equivalent technical solutions also belong to the scope of the disclosure, and the scope of patent protection of the disclosure should be limited by the claims.

What is claimed is:

1. A semi-automatic adjustment device for suppressing tension fluctuations during a rolling process of an ultra-thin strip, comprising:
    a coiler;
    a tension roller;
    a semi-automatic tension regulator, disposed between the coiler and the tension roller;
    a twenty-high roller system; and
    a semi-automatic tuned mass damper of variable stiffness and damping, disposed between the tension roller and the twenty-high roller system and comprising:
    a damping assembly, comprising: a fixing shell, springs, telescopic rods, bearing seats, slots, a mass block and a pressure roller;
    a semi-automatic variable stiffness assembly, comprising: an electromotor, a cover, a hydraulic pump, hoses, and an oil fluid;
    a semi-automatic variable damping assembly, comprising: an electrical machine, racks, gears, conductor-concentrating flux plates and permanent magnets; and
    a servo control assembly, comprising: a first acceleration sensor, a second acceleration sensor and a controller;
    wherein the fixing shell is fixedly connected to the slots;
    wherein the telescopic rods are respectively embedded in the springs, and an end of one of the springs is connected to the second acceleration sensor, another end of the one of the springs is fixedly connected to the mass block;
    wherein two ends of the pressure roller are respectively provided with the bearing seats, and the bearing seats are respectively disposed at the slots;
    wherein the permanent magnets arranged in two rows are symmetrically disposed on two sides of the mass block;
    wherein the conductor-concentrating flux plates are symmetrically disposed on the two sides of the mass block;
    wherein a side of each conductor-concentrating flux plate is a concentrating flux plate, and another side of each conductor-concentrating flux plate is a conductor baseplate; the conductor baseplates of the conductor-concentrating flux plates are disposed facing towards the permanent magnets and fixedly connected to the racks, and the racks are engaged with the gears, and the gears are connected to the electrical machine;
    wherein an interior of the mass block is a hollow structure with the oil fluid, and the interior of the mass block is connected to the hydraulic pump through the hoses, the hydraulic pump is connected to the electromotor through the cover;
    wherein the first acceleration sensor is disposed at a center position on an upper side of the mass block and configured to detect a vertical acceleration of the mass block, and the second acceleration sensor is disposed on one of the bearing seats and configured to detect a vertical acceleration of the pressure roller; the first acceleration sensor and the second acceleration sensor are connected to the controller through conducting wires;
    wherein the controller is configured to: receive acceleration signals from the first acceleration sensor and the second acceleration sensor, and process the acceleration signals to obtain instantaneous vibration frequencies of the mass block and the ultra-thin strip through Hilbert-Huang transformation algorithm; and control, in response to the instantaneous vibration frequencies of the mass block and the ultra-thin strip being inconsistent, the electrical machine and the electromotor to work individually;
    the controller is specifically configured to: change a distance between the conductor-concentrating flux plates and the permanent magnets, thereby to change a magnitude of eddy current damping control by driving the electrical machine to work to drive the gears to rotate and the racks to move along a same direction or reverse directions, and the magnitude of the eddy current damping is capable of being adjusted in real time to achieve an optimal vibration energy dissipation effect; and
    the controller is specifically configured to: change stiffness of the semi-automatic tuned mass damper of variable stiffness and damping by driving the electromotor to work to drive the hydraulic pump to adjust an amount of the oil fluid in the mass block.

2. The semi-automatic adjustment device for suppressing tension fluctuations during the rolling process of the ultra-thin strip as claimed in claim 1, wherein the semi-automatic tension regulator comprises:
    a tension regulator, comprising: an electric push rod, a baffle, dampers, springs, slots, bearing seats and a pressure roller; and
    a servo control unit, comprising: a pressure sensor and a controller.

3. The semi-automatic adjustment device for suppressing tension fluctuations during the rolling process of the ultra-thin strip as claimed in claim 2, wherein the electric push rod is fixedly connected to the baffle, and the electric push rod is connected to the controller of the servo control unit through conducting wires;
    wherein an end of one of the springs of the tension regulator is connected to the pressure sensor, and another end of the one of the springs of the tension regulator is fixedly connected to the baffle;
    wherein the dampers are embedded in the springs of the tension regulator, respectively;
    wherein two ends of the pressure roller of the tension regulator are disposed with the bearing seats of the tension regulator, respectively; and the bearing seats of the tension regulator are disposed in the slots of the tension regulator, respectively; and
    wherein the pressure sensor is disposed on an end of one of the bearing seats of the tension regulator, and configured to detect a pressure exerted on the pressure roller of the tension regulator; and the pressure sensor is connected to the controller of the servo control unit through conducting wires.

\* \* \* \* \*